United States Patent
Koenitzer et al.

(10) Patent No.: US 7,445,679 B2
(45) Date of Patent: Nov. 4, 2008

(54) CONTROLLED OXYGEN ADDITION FOR METAL MATERIAL

(75) Inventors: John W. Koenitzer, Oley, PA (US); Yongjian Qiu, Birdsboro, PA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/440,008

(22) Filed: May 16, 2003

(65) Prior Publication Data

US 2004/0226630 A1    Nov. 18, 2004

(51) Int. Cl.
C23C 14/08    (2006.01)
C25D 9/06    (2006.01)
H01G 9/04    (2006.01)

(52) U.S. Cl. .................. 148/276; 148/277; 148/281; 361/508; 361/528; 427/126.3; 205/171

(58) Field of Classification Search .......... 148/277, 148/276, 281; 361/508–509, 528; 423/592.1; 75/245, 255; 257/724; 204/290.12, 291; 427/126.3; 205/171

See application file for complete search history.

(56) References Cited

U.S. PATENT DOCUMENTS

| | | | |
|---|---|---|---|
| 1,415,516 A | 5/1922 | Bridge | |
| 1,906,184 A | 4/1933 | Bohn | |
| 2,183,517 A | 12/1939 | Leemans et al. | 75/135 |
| 2,242,759 A | 5/1941 | Schlecht et al. | 75/84 |
| 2,443,524 A | 6/1948 | Kroll et al. | 423/62 |
| 2,621,137 A | 12/1952 | Miller | 148/13.1 |
| 2,700,606 A | 1/1955 | Wilhelm et al. | 75/84 |
| 2,761,776 A | 9/1956 | Bichowsky | 75/5 |
| 2,861,882 A | 1/1958 | Bichowsky | 75/84 |
| 2,937,939 A | 5/1960 | Wilhelm et al. | 75/84 |
| 2,992,095 A | 7/1961 | Li | 75/27 |
| 3,421,195 A | 1/1969 | Berryhill | 29/25.42 |
| 3,647,420 A | 3/1972 | Restelli | 75/84 |
| 3,665,260 A | 5/1972 | Kirkpatrick et al. | 361/529 |
| 3,849,124 A | 11/1974 | Villani | 420/422 |
| 3,926,832 A | 12/1975 | Barosi | 252/181.6 |
| 3,962,715 A | 6/1976 | Raccah et al. | 357/2 |
| 4,032,328 A | 6/1977 | Hurd | 75/84.1 |
| 4,059,442 A | 11/1977 | Bernard | 75/208 R |
| 4,118,727 A | 10/1978 | Laplante | 357/10 |
| 4,126,493 A | 11/1978 | Wurm | 148/20 |
| 4,186,423 A | 1/1980 | Yoshida et al. | 361/525 |

(Continued)

FOREIGN PATENT DOCUMENTS

AU    104631    8/1937

(Continued)

OTHER PUBLICATIONS

Abstract Document No. 129:284714, 1998, no month.

(Continued)

Primary Examiner—Roy King
Assistant Examiner—Lois L. Zheng

(57) ABSTRACT

Methods to form metal oxide material are described. In one process, an oxide film on a metal material is diffused throughout the metal material to form a preferred uniform metal oxide material. The present invention further relates to products formed by the process. Also, the present invention relates to the use of the products in capacitor anodes and other applications.

19 Claims, 8 Drawing Sheets

U.S. PATENT DOCUMENTS

| | | | | |
|---|---|---|---|---|
| 4,201,798 | A | 5/1980 | Lindmayer | 427/74 |
| 4,252,629 | A * | 2/1981 | Bewer et al. | 204/290.03 |
| 4,406,699 | A | 9/1983 | Beck et al. | 75/233 |
| 4,428,856 | A | 1/1984 | Boyarina et al. | 252/181.1 |
| 4,483,819 | A | 11/1984 | Albrecht et al. | 419/2 |
| 4,495,219 | A * | 1/1985 | Kato et al. | 438/591 |
| 4,722,756 | A | 2/1988 | Hard | 148/126.1 |
| 4,748,737 | A | 6/1988 | Charles et al. | 29/599 |
| 4,805,074 | A | 2/1989 | Harakawa et al. | 361/525 |
| 4,923,531 | A | 5/1990 | Fisher | 148/126.1 |
| 4,960,471 | A | 10/1990 | Fife | 148/20.3 |
| 4,964,906 | A | 10/1990 | Fife | 75/369 |
| 5,011,742 | A | 4/1991 | Fife et al. | 428/558 |
| 5,013,357 | A | 5/1991 | Worcester et al. | 75/622 |
| 5,022,935 | A | 6/1991 | Fisher | 148/126.1 |
| 5,171,379 | A | 12/1992 | Kumar et al. | 148/422 |
| 5,211,741 | A | 5/1993 | Fife | 75/255 |
| 5,245,514 | A | 9/1993 | Fife et al. | 361/529 |
| 5,369,547 | A | 11/1994 | Evans | 361/516 |
| 5,412,533 | A | 5/1995 | Murayama et al. | 361/528 |
| 5,448,447 | A | 9/1995 | Chang | 361/529 |
| 5,470,525 | A | 11/1995 | Tripp et al. | 419/36 |
| 5,825,611 | A | 10/1998 | Pozdeev | 361/524 |
| 5,869,196 | A * | 2/1999 | Wong et al. | 428/613 |
| 5,993,513 | A | 11/1999 | Fife | 75/743 |
| 6,007,597 | A | 12/1999 | Puopolo et al. | 75/10.14 |
| 6,051,044 | A | 4/2000 | Fife | 75/229 |
| 6,051,326 | A | 4/2000 | Fife | 428/610 |
| 6,136,062 | A | 10/2000 | Loffelholz et al. | 75/369 |
| 6,191,479 | B1 * | 2/2001 | Herrell et al. | 257/724 |
| 6,312,642 | B1 | 11/2001 | Fife | 419/30 |
| 6,322,912 | B1 | 11/2001 | Fife | 428/702 |
| 6,373,685 | B1 | 4/2002 | Kimmel et al. | 361/508 |
| 6,391,275 | B1 | 5/2002 | Fife | 423/592 |
| 6,416,730 | B1 | 7/2002 | Fife | 423/592 |
| 6,462,934 | B2 | 10/2002 | Kimmel et al. | 361/508 |
| 6,527,937 | B2 | 3/2003 | Fife | 205/209 |
| 6,576,099 | B2 | 6/2003 | Kimmel et al. | 204/291 |
| 6,762,927 | B2 * | 7/2004 | Schnitter et al. | 361/508 |
| 6,833,197 | B1 * | 12/2004 | Dong et al. | 428/472.1 |
| 2002/0028175 | A1 | 3/2002 | Fife | 423/592 |
| 2002/0080552 | A1 | 6/2002 | Schitter et al. | 361/302 |
| 2002/0114722 | A1 | 8/2002 | Kimmel et al. | 419/45 |
| 2002/0135973 | A1 | 9/2002 | Kimmel et al. | 361/509 |
| 2003/0026756 | A1 * | 2/2003 | Kimmel et al. | 423/592 |
| 2003/0104923 | A1 | 6/2003 | Omori et al. | 501/134 |
| 2003/0230167 | A1 * | 12/2003 | Loeffelholz et al. | 75/255 |

FOREIGN PATENT DOCUMENTS

| | | |
|---|---|---|
| DE | 198 312 80 | 1/2000 |
| EP | 0 634 762 A1 | 9/1991 |
| EP | 0 634 761 A1 | 1/1995 |
| GB | 485318 | 5/1938 |
| GB | 489742 | 8/1938 |
| GB | 835316 | 5/1960 |
| GB | 1123015 | 8/1968 |
| WO | WO 98/19811 | 5/1998 |
| WO | WO 00/15556 | 9/1999 |
| WO | WO 00/15555 | 3/2000 |
| WO | WO 01/35428 A1 | 5/2001 |
| WO | WO 01/71738 A2 | 9/2001 |
| WO | WO 01/99130 A1 | 12/2001 |

OTHER PUBLICATIONS

Abstract Document No. 129:130191, 1998, no month.
Abstract Document No. 128:288971, 1998, no month.
Abstract Document No. 85:170443, 1976, no month.
Abstract Document No. 83:140466, 1975, no month.
Abstract Document No. 104:229152, 1986, no month.
Abstract Document No. 104:198128, 1986, no month.
Abstract Document No. 108:122980, 1988, no month.
Abstract Document No. 106:42412, 1987, no month.
Abstract Document No. 110:224093, 1989, no month.
Abstract Document No. 109:103212, 1988, no month.
Abstract Document No. 116:199338, 1992, no month.
Abstract Document No. 113:10823, 1990, no month.
Abstract Document No. 120:179957, 1994, no month.
Abstract Document No. 119:84165, 1993, no month.
Abstract Document No. 118:86049, 1993, no month.
Mellor "Inorganic and Theroretical Chemistry" vol. IX, pp. 856-857, no date.
Pages 59, 65 and 66 of Encyclopedia of Chemical Technology, vol. 17, 4$^{th}$ Edition, no date.
Young article, pp. 4 and 5 of Chapter 2, no date, no citation.
Vest et al., "Electrical Conductivity in Ceramics and Glass" Department of the Air Force, Aerospace Research Laboratories Wright-Patterson Air Force Base, Ohio. pp. 375-384. (1974).
Feschotte, et al., "Niobium Physico-Chemical Properties Of TTS Compounds and Alloys" Atomic Energy Review, Special Issue No. 2. International Atomic Energy Agency—Vienna (1968). pp. 57-59.
Kuz' micheva, et al., "Superconductivity in lathanide-strontium-niobium-oxide system" Sh. Neorg. Khim. 38(1), 162-6. (1993).
Acrivos, et al., "Dynamics phenomena in superconducting oxides measured by ESR" Phys. Rev. B: Condens. Matter, 50(18), pp. 12710-12723. (1994).
Acrivos, et al., "Dynamics of flux motion . . . " Physica C (Amsterdam) 234-40(Pt. 5), pp. 3159-3160. (1994).
International Search Report for PCT/US99/21413 mailed Sep. 16, 1999.
Georg Bauer, "The Oxides of Niobium," Zeitschrift fuer anorganische und allgemeine Chemie, vol. 248, Sep. 12, 1941, No .1, pp. 1-31. (With Full English Translation).
J. W. Mellor, A Comprehensive Treastie on Inorganic and Theoretical Chemistry, Sep. 1947, vol. IX, p. 856.
"Niobium and Oxygen" Gmelins Handbook of Inorganic Chemistry, Verlag Chemi, 1970, pp. 14-44 (with English Translation).
Hiraoka et al., "Electrochemical Measurement of the Standard Free Energies of Formation of Niobium Oxides," Transactions ISIJ, vol. 11, pp. 102-106 (1971).
Baba et al., "Preparation and Chlorination of NbO$_2$, NbO and NbO," Journal Mining and Mettallurgical Institute of Japan, vol. 82, No. 942, pp. 855-860 (1966).
Steeb, et al., "NIOB und Sauerstoff," Gmelin, Niob, Part B1, vol. 49, pp. 26-33 (1970) w/ partial English trans.
Mudrolyubov, "Production of tantalum capacitors in the C.I.S," Philadelphia meeting of the TIC, pp. 3-4 (1991).
Andersson, "Die Bedeutung des Tantals in der Kondensatorindustrie," Erzmetall, vol. 48, No. 6/7, pp. 430-434 (1995).
Brauer et al., "Die Nitride des Niobs," Z. anorg. Allg. Chemie, vol. 270, pp. 160-178 (1952) w/ partial Engl. Trans.
Brauer, "Nitrides, Carbonitrides and Oxynitrides of Niobium," Journal of the less-Common Metals, vol. 2, pp. 131-137, (1960).
Schonberg, "Some Features of the Nb-N and Nb-N-O Systems," ACTA Chem. Scand., vol. 8, pp. 208-212 (1954).
Bauer, "The Oxides of Niobium," Zeitschrift fuer anorganische und allgemeine Chemie, vol. 248, No. 1, pp. 15-45 (1941) with full English translation.
Gannon et al., "The Microstructure of Slightly Substoichiometric NbO$_2$," Journal of Solid State Chemistry, vol. 20, pp. 331-344 (1977).
Schafer, "Uber die Darstellung der Nioboxide und ihren Transport im Temperaturgefalle," Z. anorg. Allg. Chemie. vol. 317, pp. 321-333, (1962) w/ partial English translation.
Mifune, et al., "Niobium Solid Electrolytic Capacitors," National Technical Report 1, 147, pp. 1-14, (1963) with English translation.
Lapitskii et al., "The formation of the lower oxides of niobium and tantalum in some reactions of reductions and oxidation," Zhurnal Neoganicheskoi Khimii, vol. II, No. 1, pp. 80-91, (1957).
Orlov et al., "Study of Oxygen Solubility in Niobium," Metally, No. 5, pp. 202-205 (1985).
Bauer et al., "Mikrokristallines NbO," p. 1462 w/ partial Enligsh translation.

Notice of Opposition for EP 1115658 B1 with English Translation filed Apr. 2, 2004 by H.C. Stark GmbH.

Notice of Opposition for EP 1115658 B1 in English filed Apr. 8, 2004 by Strawman Limited.

Schnitter et al., "New Niobium Based Materials for Solid Electrolyte Capacitors," *Proceedings of the 16th Passive Components Conference*, Carts, Europe, 2002, pp. 26-31.

Bogdan et al., "Study of the structure and space charge of niobium oxide films after aging," Database Caplus "Online," Chemical Abstracts Service, (1984) (Abstract).

International Search Report for PCT/US2004/015137 dated Nov. 17, 2004.

International Preliminary Report on Patentability and Written Opinion of the International Searching Authority for PCT/US2004/015137 dated Dec. 1, 2005.

\* cited by examiner

CONTROLLED OXYGEN ADDITION FOR METAL MATERIAL

BACKGROUND OF THE INVENTION

The present invention relates to metal, and more particularly relates to metal containing desired amounts of oxygen, such as metal oxide materials.

It has been found that oxygen enriched metal substrates offer some advantages over their pure metal counterparts. For example, capacitors made from oxygen enriched Nb have low leakage current and are less sensitive to contaminates such as carbon. It is proposed that the presence of oxygen reduces the contamination level via oxidation during the high temperature manufacturing process. Though air or controlled atmosphere exposure can introduce oxygen into a metal substrate, precise control of the process is far from simple. This results from the fact that many metal substrates, especially those in a high surface area powdery form are highly reactive and the oxidation tends to be localized, which makes controlled oxidation difficult.

Furthermore, the benefits of valve metal suboxides, such as niobium suboxides, in such applications as capacitor anodes has been shown to be useful. In a typical process, niobium metal powder, for instance, is mixed with niobium pentoxide and heat treated to form a desired niobium suboxide such as NbO. In the product made by this method, the physical structure of the raw materials typically remains. The residual niobium pentoxide structure, which can have a fine microstructure, may inhibit to some extent the impregnation steps in forming the finished capacitor. While the current method of forming valve metal suboxides is very beneficial and provides many advantages over standard capacitor anodes, methods to better improve the overall pentoxide and its use in an anode would be beneficial.

SUMMARY OF THE PRESENT INVENTION

A feature of the present invention is to provide methods for the controlled oxygen addition to metal particles.

An additional feature of the present invention is to provide improved methods on the formation of metal oxides, such as metal suboxides.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method to form metal oxide materials. One method includes forming an oxide film on a metal material and diffusing the oxygen from the oxide film through the metal material to form a metal oxide material.

The present invention further relates to other embodiments to form a metal oxide material. One method includes pressing the metal powder to form a pressed article and then forming an anodic oxide film on the pressed article. The method includes heat treating the pressed article to form a metal oxide material.

In another method, the metal oxide material is formed by pressing metal powder to form a pressed article and then forming an anodic oxide film on the pressed article. The pressed article is then reduced to a powder or other desirable form.

The present invention further relates to products produced by one or more of the above-identified described processes.

It is to be understood that both the foregoing general description and the following detailed description are exemplary and explanatory only and are intended to provide a further explanation of the present invention, as claimed.

The accompanying drawings, which are incorporated in and constitute a part of this application, illustrate aspects of the present invention and together with the description serve to explain the principals of the present invention.

DETAILED DESCRIPTION OF THE PRESENT INVENTION

Figure 1:
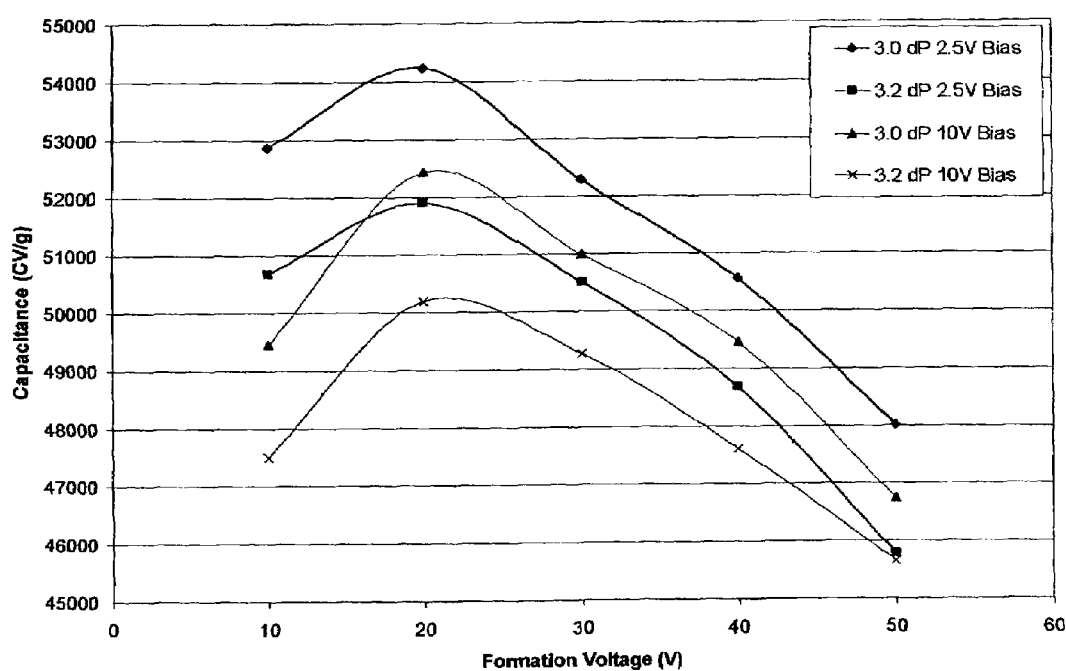
FIG. 1 illustrates the capacitance change at different formation voltages.

The present invention relates to metal particles, and more particularly to metal oxide materials, such as powders, articles, and the like. The present invention in addition relates to methods of forming metal oxide materials.

For purposes of the present invention, the metal can be any metal or alloy thereof. For instance, the metal can be any valve metal. Examples include, but are not limited to, at least one metal in Groups 4, 5, and 6 (IUPAC designations) of the Periodic Table, aluminum, bismuth, antimony, and alloys thereof and combinations thereof. Preferably, the valve metal is tantalum, aluminum, titanium, zirconium, niobium, and/or alloys thereof, and most preferably is niobium, tantalum, or alloys thereof. Generally, the alloys of the valve metal will have the valve metal as the predominant metal present in the alloy.

The metal oxide formed in the present application is a metal oxide containing one or more of the above-described metals and oxygen.

In the present invention, in one embodiment, the present invention relates to forming metal oxide materials, such as powders. The process involves forming an oxide film on the metal material and then diffusing oxygen from the oxide film through the metal material to form a metal oxide material.

In more detail, the oxide film formed on the metal material can be any oxide film capable of diffusing oxygen from the film and into the metal material to form a metal oxide material. The oxide film is typically a metal oxide film and more preferably is a metal oxide film that contains the same metal as in the metal material. For instance, when the metal material is niobium, the oxide film is preferably a niobium oxide film, such as niobium pentoxide. Examples of other suitable metal oxide films include, but are not limited to tantalum pentoxide, vanadium pentoxide, and aluminum pentoxide and the like.

The thickness of the oxide film is a thickness sufficient to provide a sufficient amount of oxygen so as to at least partially diffuse or fully diffuse from the oxide film and into the metal material to form the desired metal oxide material.

The diffusing of the oxide film into the metal material can be uniform or non-uniform. In other words, the diffusing of the oxide film into the metal material can be partial or complete. If partial, then there can optionally be portions of the metal material that remain a metal while other portions of the metal material are converted to a metal suboxide. As an example, depending upon the thickness of the oxide film, a metal material can be formed wherein part of the metal material is Nb and other parts of the metal material are converted to NbO. Preferably, the diffusing of the oxide film into the metal material is uniform to provide a substantially uniform metal suboxide material such as, NbO. Generally, the amount of voltage applied onto the metal material to form the metal oxide film will determine the amount of oxygen present in the oxide film and thus will further determine the amount of oxygen that diffuses into the metal material to form the metal suboxide. For instance, as shown in some of the examples, a voltage of 10 volts applied to an anode type metal material will lead to a certain percentage of oxygen formed in the oxide layer which then can be diffused into the metal material. Generally, the voltage applied to form the oxide film will be from about 5 volts or less to about 60 volts or more. More preferably, the voltage applied is from about 10 volts to about 50 volts to form a satisfactory amount of oxide film to diffuse into the metal material to form the various products of the present invention.

Generally, the anodization of the metal material can be achieved in any manner such as, by placing the metal material in an electrolyte and creating the desired voltage. The metal material can be in the form of a pressed and/or sintered body such as, an anode body. The pressing of the material and/or sintering of the material is optional. As long as there is enough conductivity throughout the metal material to support a current density, the metal material can be in any state to achieve the formation of an oxide film. Thus, the metal powder can be placed in a container so that a current density is achieved throughout the metal material. The metal material can be in a mold, can be pressed like an anode, and the like. Furthermore, the metal material can be processed using water agglomeration techniques such as described in International Patent Application No. WO 99/61184, incorporated in its entirety by reference herein. Depending upon the anodization voltage used, one can easily determine the voltage achieved by the color observed after anodization. For instance, at 10 volts, a brownish red color is seen. At 20 volts, a light blue color is seen. At 30 volts, a light green color is seen. At 40 volts, a brick red color is seen. At 50 volts, a dark bluish purple color is seen. Using the colors observed during the anodization process makes it quite easy to determine the voltage achieved as well as to determine the appropriate film thickness desired in order to achieve the final product. For example, as a general rule, the growth rate of an oxide film on niobium metal is about 39 nm per volt.

As indicated, the oxide film, for instance, can be an anodic oxide film, which can be formed, for instance, by applying a DC voltage to the metal material in an electrochemical cell to form the anodic oxide film. The manner in which anodization can be accomplished is as follows. Samples can be placed in an electrolyte solution having an acid and water. Exemplary acids that can be used are $H_3PO_4$, $H_2SO_4$, etc. or combinations of acids can be used. Additionally any type of water having ions can be used. Exemplary types of water that can be used are tap water and/or distilled water. Preferably, the temperature of the electrolyte solution is at 85° C.; however, the electrolyte solution having other temperatures can also be used. A constant current can then be passed through the solution. The constant current can be any current. For example, a 135 ma/g current can be used. A preset voltage for a predetermined time can then be applied to form a desired film thickness. The product can then be soaked for a predetermined temperature and time, for example at 60° C. for 30 minutes, and then dried for a predetermined time and temperature. For example, the drying of the product can take place in an oven at about 60° C. for about 120 minutes.

In the present invention, the oxygen content eventually present in the metal oxide material can be precisely controlled since the applied voltage determines the thickness of the oxide film and thus the amount of oxygen diffusing ultimately into the metal material to form the metal oxide material.

Generally, the diffusing of the oxygen from the oxide film occurs to the degree that the initial oxide film dissipates into the metal material. A further oxide film can also be formed. The further oxide film can be formed in two different manners. For example, after the furnace treatment, as the metal/metal oxide is being cooled a pentoxide layer can be formed on the surface. Such a formation is called passivation layer. Additionally, a further oxide film can be re-grown on the surface by a second anodization process.

The metal material on which the oxide film is formed can be any shape. The metal materials are preferably in the shape of a pressed article, such as a block or anode shaped material. Generally, any shape that permits the formation of an oxide film is suitable for purposes of the present invention. For example, the metal material can be in a shape of rectangle, cylinder, disk, or any other shape that allows the particles to be in contact with each other to conduct electricity.

The preferably pressed article can be formed by any technique such as taking powder and placing it in a mold and using sufficient pressure to press the metal together to obtain a pressed article. The pressed density can be any desired density for instance, from about 1 to about 4 g/cc. Preferably, the metal material has a high purity such as, a combined iron, nickel, chromium content of below 100 ppm and more preferably below 50 ppm, for instance, for a valve metal such as tantalum or niobium. The metal material can have essentially any Scott densities and preferably from about 0.7 to about 5 or more g/ml. The starting material can be any form of metal material and in any shape such as, nodular, flake, platelet, and combinations thereof. For instance, the starting material can have BET surface areas of from about 0.5 to 10 $m^2$/g or more, and more preferably from about 2 about 3 $m^2$/g.

Prior to diffusing the oxygen from the oxide film, any residual electrolyte can be removed by washing or other cleaning techniques.

Once the oxide film is present on the metal material, such as the pressed article, the oxygen can be diffused from the oxide film and into the metal material and preferably throughout the metal material to preferably form a uniform metal oxide material. The oxygen can be diffused from the oxide film using any technique. For instance, the metal material with the oxide film can be subjected to heat treating at a sufficient temperature and for a sufficient time to diffuse the oxygen from the oxide film through the metal material to form the desired metal oxide material. The diffusing of the oxide film into the metal material can be done while the metal material is in the shape of a pressed article or can be done after reducing the pressed article into powder form or other desirable shapes. With respect to the preferred method of diffusing the oxygen, the heat treatment preferably occurs at a temperature of from about 200° C. to about 1500° C., and can occur in a vacuum furnace. Other temperature ranges include from about 500° C. to about 1,200° C. for generally a time of 1 hour or so. Other sufficient times to achieve diffusing can be used. This allows the oxygen to homogenize within the metal materials by way of diffusion. The heat treating at a sufficient temperature and for a sufficient time can be done in an inert atmosphere, a hydrogen atmosphere, or in a vacuum. Generally, the temperature and the time of heat treating can be based on the geometry of the metal material containing the oxide film. Generally, a lower temperature requires more time to achieve uniform diffusion of the oxygen from the oxide film while a higher temperature causes diffusion more rapidly. Additionally, atmospheric conditions of the reactor can also influence the required time to achieve uniform diffusion of the oxygen from the oxide film to the metal. For example, heating the metal and the metal oxide film in a hydrogen atmosphere requires less time to achieve uniform diffusion of the oxygen from the oxide film to the metal than in an argon or vacuum atmosphere.

The ultimately formed metal oxide material, as indicated above, is a metal oxide of the starting metal material.

The starting metal material can be any shape or size. Preferably, the metal material is in the form of a plurality of particles. Examples of the type of powder that can be used include, but are not limited to, flaked, angular, nodular, and mixtures or variations thereof. Examples of metal powders include those having mesh sizes of from about 60/100 to about 100/325 and from about 60/100 to about 200/325 mesh. Another range of sizes is from about −40 mesh to about −325 mesh.

The heat treatment occurs preferably in an atmosphere which permits the transfer of oxygen atoms from the oxide film to the metal material. The heat treatment can occur in a hydrogen containing atmosphere. In combination or alternatively, the heat treatment can occur in an inert gas.

During the heat treatment step, a constant heat treatment temperature can be used during the entire heat treating process or variations in temperature or temperature steps can be used.

In addition, the formation of the metal oxide material can be performed in the presence of nitrogen or other doping materials in order to prepare a metal oxide material having dopants present, such as nitrogen. The metal oxide material is any metal oxide which preferably has a lower oxygen content than the metal oxide film. Typical reduced valve metal oxides comprise NbO, $NbO_{0.7}$, $NbO_{1.1}$, $NbO_2$, TaO, AlO, $Ta_6O$, $Ta_2O$, $Ta_2O_{2.2}$, or any combination thereof with or without other oxides present. Generally, the reduced metal oxide of the present invention has an atomic ratio of metal to oxygen of about 1: less than 2.5, and preferably 1:2 and more preferably 1:1.1, 1:1, or 1:07. Put another way, the reduced metal oxide preferably has the formula $M_xO_y$ wherein M is a valve metal, x is 2 or less, and y is less than 2.5x. More preferably x is 1 and y is less than 2, such as 1.1, 1.0, 0.7, and the like. Preferably, when the reduced valve metal oxide is tantalum, the reduced metal oxide has an atomic ratio of metal to oxygen of about 1: less than 2, such as 1:0.5, 1:1, or 1:0.167 or has a ratio of 2:2.2.

The present invention further relates to products prepared by one or more of the above-described processes.

As indicated above, the metal oxide material can be then reduced into a powder prior to or after the diffusing of the oxygen. The reduction to particles can be done in any manner such as milling, crushing, and the like, to reduce the particles to a size of from about 50 microns to about 400 microns.

The present invention in one embodiment eliminates localized oxidation which thereby yields a homogenous product.

The present invention will be further clarified by the following examples, which are intended to be exemplary of the present invention.

EXAMPLES

Example 1

Niobium flaked powder having a BET surface area of about 2.0 m²/g was pressed into the shape of anodes. The pressing was achieved using a Barbuto anode press with a press density of 3.0 or 3.2 g/cc. The various parameters of the anode fabrication are set forth below in Table 1.

TABLE 1

| Press Density (g/cc) | 3.0 | 3.2 |
|---|---|---|
| Number of Anodes | Minimum of 500 | Minimum of 500 |
| Powder weight (mg) | 150 | 150 |
| Anode length (in) | 0.1785 | 0.1785 |
| Anode width (in) | 0.1785 | 0.1785 |
| Anode height (in) | 0.096 | 0.09 |

The anodes were sintered at a temperature of 1300° C. for 10 minutes wherein the temperature of 1300° C. was achieved using a 10'/A ramp. After sintering, the anodes were anodized at 10 through 50 volts to form a $Nb_2O_5$ film on the anode surfaces. The details of the anodization are set forth below in Table 2.

TABLE 2

| | 10 V Ef Anodization | 20 V Ef Anodization | 30 V Ef Anodization | 40 V Ef Anodization | 50 V Ef Anodization |
|---|---|---|---|---|---|
| Number of Anodes per sample per press density | 100 | 100 | 100 | 100 | 100 |
| Electrolyte | 0.1% $H_3PO_4$ @ 85 Deg C., @ 4.3 mmho | 0.1% $H_3PO_4$ @ 85 Deg C., @ 4.3 mmho | 0.1% $H_3PO_4$ @ 85 Deg C., @ 4.3 mmho | 0.1% $H_3PO_4$ @ 85 Deg C., @ 4.3 mmho | 0.1% $H_3PO_4$ @ 85 Deg C., @ 4.3 mmho |
| Constant current density (ma/g) | 135 | 135 | 135 | 135 | 135 |
| Terminal Voltage | 10.0 VDC +/− 0.03 | 20.0 VDC +/− 0.03 | 30.0 VDC +/− 0.03 | 40.0 VDC +/− 0.03 | 50.0 VDC +/− 0.03 |
| Terminal Voltage | 180 min −0/+5 min | 180 min −0/+5 min | 180 min −0/+5 min | 180 min −0/+5 min | 180 min −0/+5 min |

TABLE 2-continued

|  | 10 V Ef Anodization | 20 V Ef Anodization | 30 V Ef Anodization | 40 V Ef Anodization | 50 V Ef Anodization |
|---|---|---|---|---|---|
| Time |  |  |  |  |  |
| 60 C. soak time (min) | 30 | 30 | 30 | 30 | 30 |
| 60 C. oven time (min) | 120 | 120 | 120 | 120 | 120 |

Figure 2:
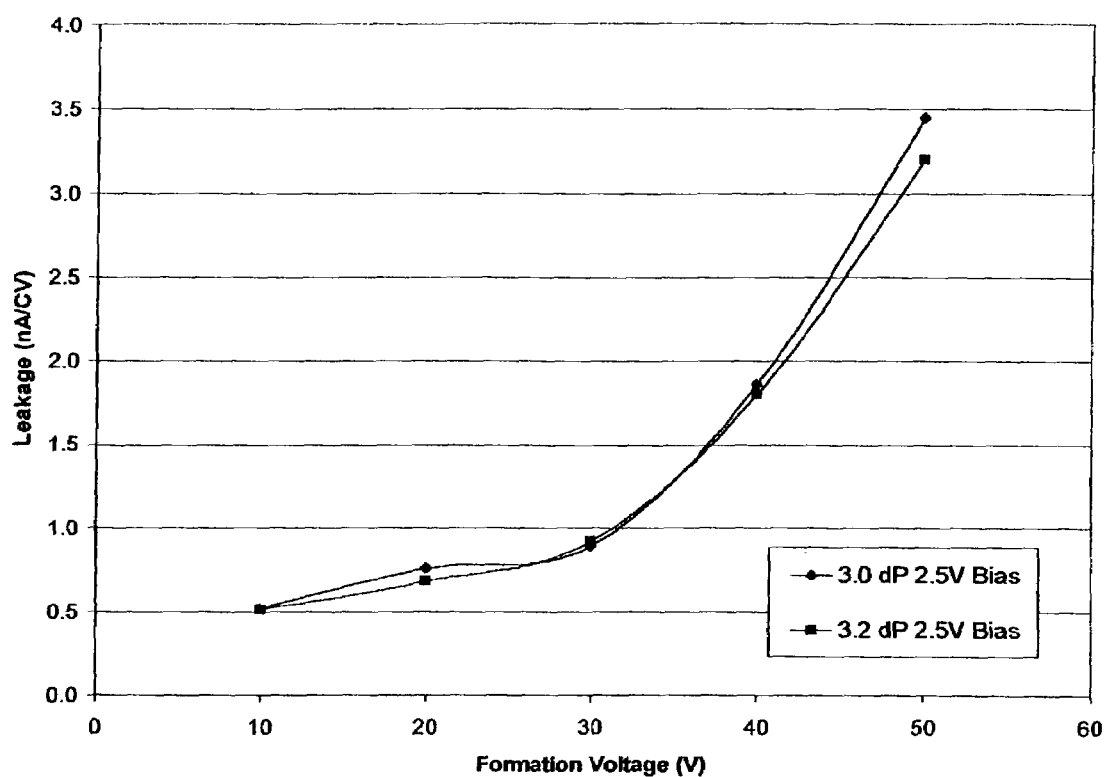
FIG. 2 illustrates the DCL change at different formation voltages.

Afterwards, the anodes were placed in a vacuum furnace wherein the furnace was slowly evacuated to less than 20 torr. Afterwards, 50 SCFH (standard cubic foot per hr.) of argon gas was introduced and the temperature was increased to 900° F. using a ramp of 30° F. per minute. Then, the temperature was increased to 1562° F. using a ramp of 30° F. per minute. This temperature was held for 30 minutes and then the temperature decreased. The temperature was held at 1000° F. for 5 minutes and then cooled to below 200° F. where air-venting with passivation was used. The results of the capacitance achieved for each respective formation voltage as well as the DC leakage for each respective product formed are set forth in FIGS. 1 and 2 respectively. Furthermore, the amount of oxygen in each anode was then analyzed and the information is set forth in Table 3. The initial O content was about 7811 ppm.

TABLE 3

| Voltage Applied (v) | % O | Total ppm O measured | ppm O minus init. O= | Calc. O content Theoretical (0.5 m2/g BET of anode) |
|---|---|---|---|---|
| 10 | 3.54 | 35400 | 27589 | 26464 |
| 20 | 5.45 | 54500 | 46689 | 51573 |
| 30 | 6.89 | 68900 | 61089 | 75428 |
| 40 | 9.06 | 90600 | 82789 | 82789 |
| 50 | 10.3 | 103000 | 95189 | 119732 |

Table 4 sets forth the various capacitance and DC leakage achieved for each product using the various formation voltages. In some analysis conducted of the anodes, it was determined that in some samples $Nb_2N$ was also present in the sample and this was achieved by using a niobium powder that had nitrogen levels present. Accordingly, one option of the present invention is to start with a niobium powder having such nitrogen levels or other dopants in order to achieve metal suboxide materials which further contain subnitride levels or other sub-dopant levels furthermore, based on oxygen levels, the 50 volt sample after heat treatment was a $NbO_{0.71}$. It was observed that the oxygen levels increased linearly with the formation voltage and based on this information, a formation voltage of approximately 72 volts would result in achieving a NbO product.

TABLE 4

| Formation Voltage (v) | Press Density (g/cc) | 2.5 Bias CV/g | 10 Bias CV/g | DCL uA/g | DCL nA/CV | Oxygen ppm |
|---|---|---|---|---|---|---|
| 10 | 3.2 | 51250 | 49289 | 55.32 | 1.08 | 38,100 |
| 20 | 3.2 | 49815 | 48131 | 70.80 | 1.42 | 58,100 |
| 30 | 3.2 | 48639 | 46536 | 105.27 | 2.16 | 76,200 |
| 40 | 3.2 | 47557 | 43411 | 100.73 | 2.12 | 89,700 |
| 50 | 3.2 | 46956 | 40223 | 165.69 | 2.04 | 109,000 |

Example 2

Niobium flake powder having a BET surface area of 2.0 $m^2/g$ was pressed into the shape of anodes. The initial oxygen content of the niobium flake powder was 7811 ppm. Additionally, the niobium flake powder also included 450 ppm of combined iron, nickel, and chromium. The pressing was achieved using a Barbuto anode press with a press density of 3.0 or 3.2 g/cc. The various parameters of the anode fabrication are set forth below in Table 5.

TABLE 5

| Press Density (g/cc) | 3.0 | 3.2 |
|---|---|---|
| Number of Anodes | Minimum of 500 | Minimum of 500 |
| Powder weight (grams) | 150 | 150 |
| Anode length (cm) | 0.1785 | 0.1785 |
| Anode width (cm) | 0.1785 | 0.1785 |
| Anode height (cm) | 0.096 | 0.09 |

The anodes were sintered at a temperature of 1300° C. for 10 minutes wherein the temperature of 1300° C. was achieved by using a vacuum sintering furnace (10'/A ramp). After sintering, the anodes were anodized at 10 through 50 volts in 10 volt increments to form an anode film on the anode surfaces. The details of the anodzation of this example are identical to the details of the anodization set forth in Example 1.

Once the anodization was completed at 10 V, 20 V, 30 V, 40 V and 50 V, DC to form the $Nb_2O_5$ film layer, leakage/capacitance-ESR testing was performed to ensure that the $Nb_2O_5$ film layer was present and as a base line. The various parameters of the DC leakage/capacitance are set forth below.

DC Leakage Testing - - -
   70% Ef Anodization Voltage, 10% $H_3PO_4$ @ 21° C.
   60, 120, and 180 second charge time
Capacitance-DF Testing:
   18% $H_2SO_4$ @ 21° C., 120 Hz, Bias @ 2.5, 10 vdc
Mercury porosimetry
   (a) N=3 anodes per sample for Hg submission.

Afterwards, the anodes were placed in a vacuum furnace, as in Example 1. The samples were then labeled as:

| (A) 10 V | (B) 20 V | (C) 30 V |
|---|---|---|
| (D) 40 V | (E) 50 V | |

The products were then anodized at 35 volts to form the metal oxide film layer. The details of the anodization are set forth below in Table 6.

TABLE 6

| | Sample | | | | |
|---|---|---|---|---|---|
| | A 10 V | B 20 V | C 30 V | D 40 V | E 50 V |
| Electrolyte | 0.1% $H_3PO_4$ @ 85 Deg C., @ 4.3 mmho | 0.1% $H_3PO_4$ @ 85 Deg C., @ 4.3 mmho | 0.1% $H_3PO_4$ @ 85 Deg C., @ 4.3 mmho | 0.1% $H_3PO_4$ @ 85 Deg C., @ 4.3 mmho | 0.1% $H_3PO_4$ @ 85 Deg C., @ 4.3 mmho |
| Constant current density (ma/g) | 135 | 135 | 135 | 135 | 135 |
| Terminal Voltage | 35.0 VDC +/− 0.03 | 35.0 VDC +/− 0.03 | 35.0 VDC +/− 0.03 | 35.0 VDC +/− 0.03 | 35.0 VDC +/− 0.03 |
| Terminal Voltage Time | 180 min −0/+5 min | 180 min −0/+5 min | 180 min −0/+5 min | 180 min −0/+5 min | 180 min −0/+5 min |
| 60° C. soak time (min) | 30 | 30 | 30 | 30 | 30 |
| 60° C. oven time (min) | 120 | 120 | 120 | 120 | 120 |

After anodizing the product at 35 volts, DC leakage/capacitance-ESR of eight anodes per sample (A) through (E) were tested under the following conditions:
(a) DC leakage Testing - - -
70% EF Test Voltage, 10% $H_3PO_4$ @21° C.
60, 120, and 180 second charge time
(b) Capacitance-DF Testing:
18% $H_2SO_4$ @ 21° C., 120 Hz, Bias @ 2.5, 10 vdc
Mercury porosimetry —N=3 anodes per sample for Hg submission.

Table 7 sets forth the various capacitance and DC leakage achieved after heat cycle and reformation of the anode film layer at 35 V for each product using the various formation voltages.

TABLE 7

| | | | After heat cycle and reformation at 35 V | | |
|---|---|---|---|---|---|
| Lot | Trial | Formation Voltage | 2.5 V Bias CV/g | 10 V Bias CV/g | DCL uA/g @ 60 s | Oxygen (ppm) |
| Flake | 1 | 10 | 51250 | 49289 | 55.32 | 38100 |
| Flake | 1 | 20 | 49815 | 48131 | 70.8 | 58100 |
| Flake | 1 | 30 | 48639 | 46536 | 105.27 | 76200 |
| Flake | 1 | 40 | 47557 | 43411 | 100.73 | 89700 |
| Flake | 1 | 50 | 46956 | 40223 | 95.8 | 109000 |

Figure 3:
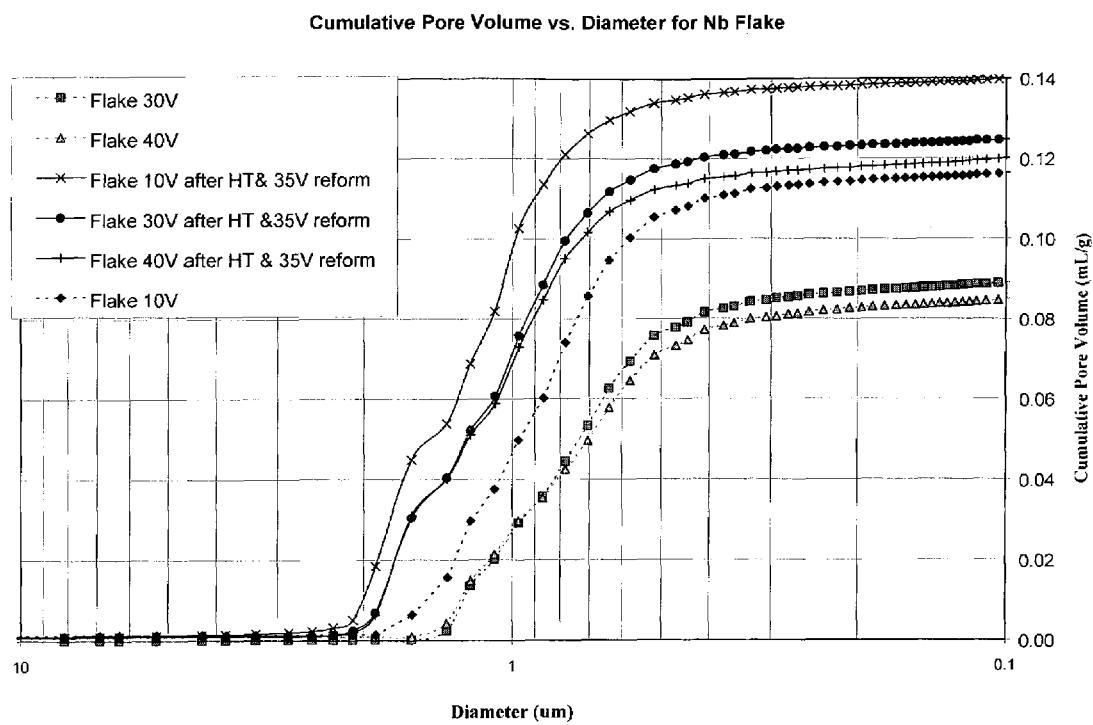
FIG. 3 illustrates the cumulative pore volume versus the diameter before and after anode reformation.

The pore structure of the sintered and formed anodes was measured after the first and second anodization step. The total pore volume increased after the second anodization when compared to the first anodization. There was also more volume present and larger pore diameters after the second formation. This indicates that the anodes will be easier to impregnate with $MnO_2$ after the second formation than after only the first formation. The anodes formed at the lowest initial voltages had the highest total pore volume. This is due to the growth of the $Nb_2O_5$ film, which is proportional to the formation voltage. At lower voltages, the $Nb_2O_5$ film grows the least and consumes the smallest amount of the pore volume. FIG. 3 illustrates the cumulative pore volume versus the diameter for the anode before and after anode reformation.

Example 3

Niobium flake powder having a BET surface area of about 2.0 $m^2$/g and having an initial oxygen content of 7811 ppm and 450 ppm of combined iron, nickel, and chromium was pressed into the shape of anodes. Additionally, nodular niobium having a BET surface area of 2.0 $m^2$/g and having an initial oxygen of 8000 ppm and 23 ppm of combined iron, nickel, and chromium was pressed into the shape of anodes. The pressing was achieved using a Barbuto anode press as in Example 2. The anodes were also sintered in accordance to the sintering process of Example 2. After sintering, the anodes were anodized at 20, 40, 50, 60 and 70 volts. Except for the formation voltages, the details of the anodization were identical to the anodization procedure of Example 2. Similarly, the DC leakage/capacitance testing was identical to the DC leakage/capacitance testing of Example 2. Additionally, the furnace procedure, the anode reformation, and testing were identical to the furnace procedure and the anode reformation and testing of Example 2.

Table 8 sets forth the various capacitance and DC leakage achieved after heat cycle and reformation at 35 V to reform the metal oxide film layer for each product using the various formation voltages.

TABLE 8

| | | | After heat cycle and reformation mat 35 V | | | |
|---|---|---|---|---|---|---|
| Lot | Trial | Formation Voltage | 2.5 V Bias CV/g | 10 V Bias CV/g | DCL uA/g @ 60 s | Oxygen (ppm) |
| Flake | 2 | 20 | 54899 | 52921 | 79.52 | 61800 |
| Flake | 2 | 40 | 54833 | 50084 | 138.55 | 98200 |
| Flake | 2 | 50 | 55156 | 47363 | 150.95 | 113000 |
| Flake | 2 | 60 | 55038 | 44928 | 177.68 | 142000 |
| Flake | 2 | 70 | 59651 | 46404 | 342.26 | 181000 |
| Nodular | 2 | 20 | 57527 | 51410 | 47.67 | 53700 |
| Nodular | 2 | 40 | 60998 | 49022 | 39.2 | 87800 |
| Nodular | 2 | 50 | 63792 | 47823 | 31.31 | 98700 |
| Nodular | 2 | 60 | 63891 | 46112 | 27.63 | 124000 |
| Nodular | 2 | 70 | 63729 | 46071 | 25.8 | 154000 |

Figure 5:
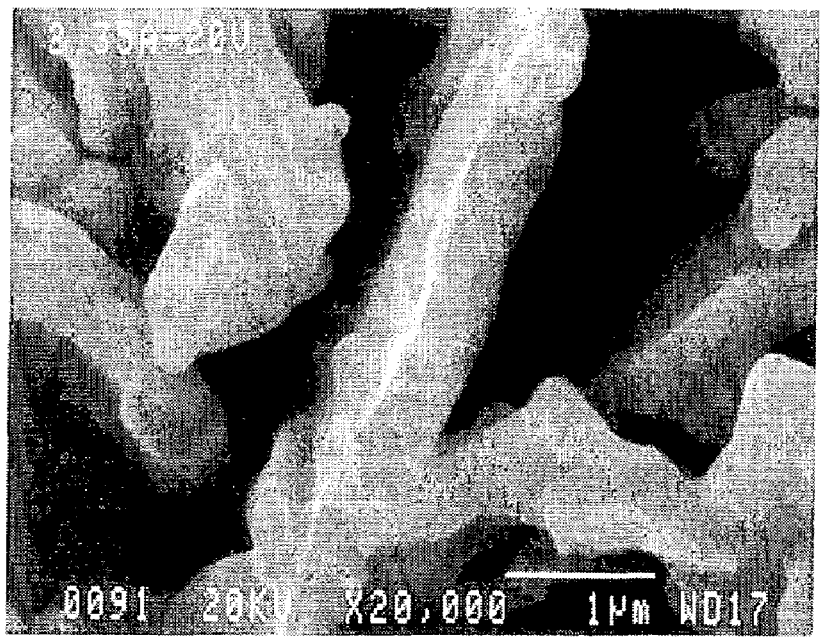
FIG. 5 is an illustration of 20,000×SEM of an anode formed at 20 V.
Figure 4:
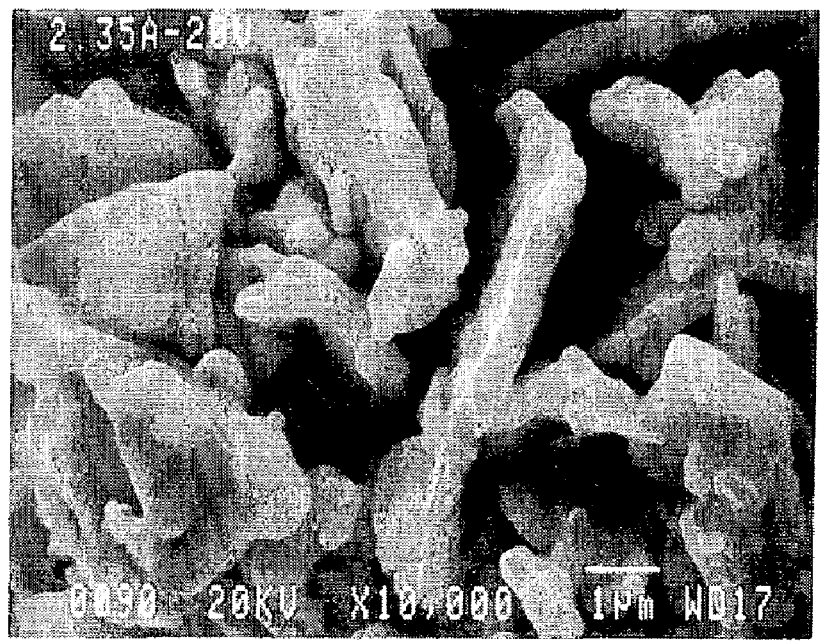
FIG. 4 is an illustration of 10,000×SEM of an anode formed at 20 V.
Figure 6:
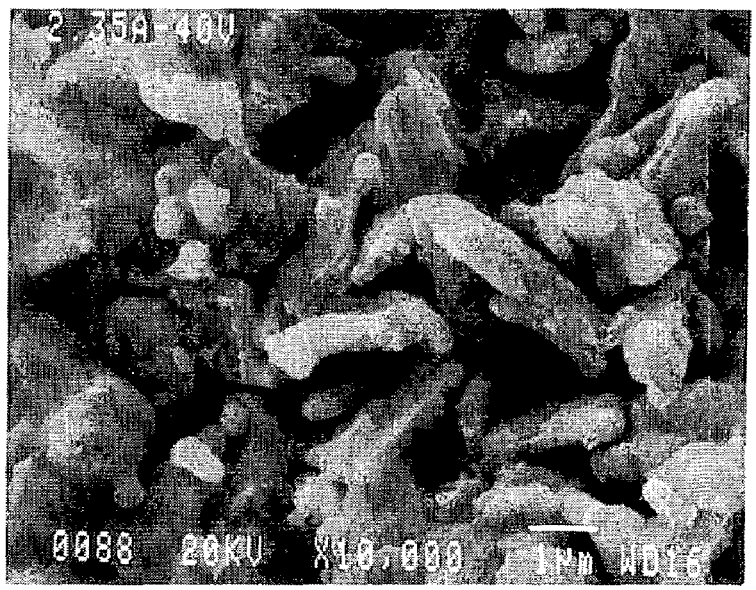
FIG. 6 is an illustration of 10,000×SEM of an anode formed at 40 V.
Figure 7:
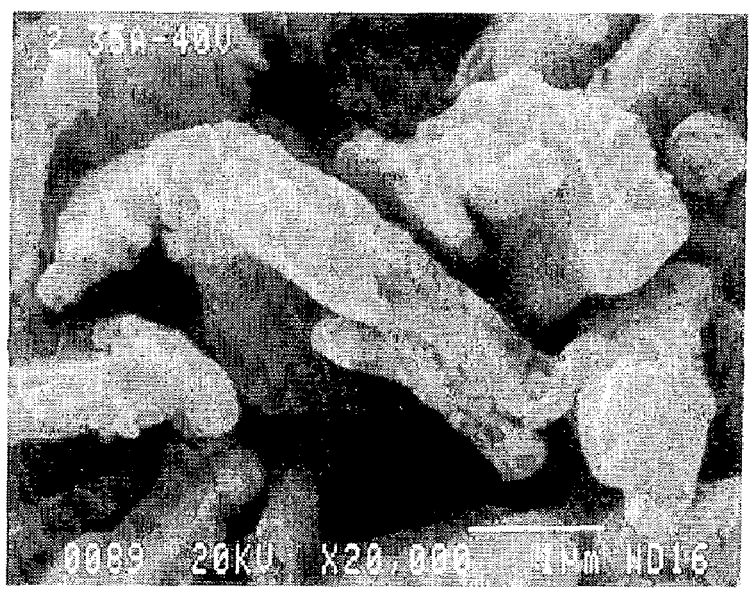
FIG. 7 is an illustration of 20,000×SEM of an anode formed at 40 V.
Figure 8:
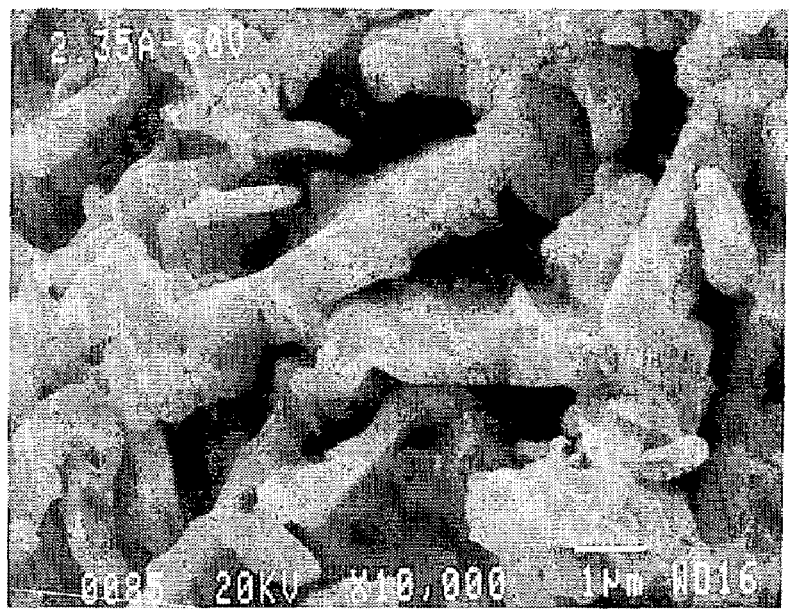
FIG. 8 is an illustration of 10,000×SEM of an anode formed at 60 V.
Figure 9:
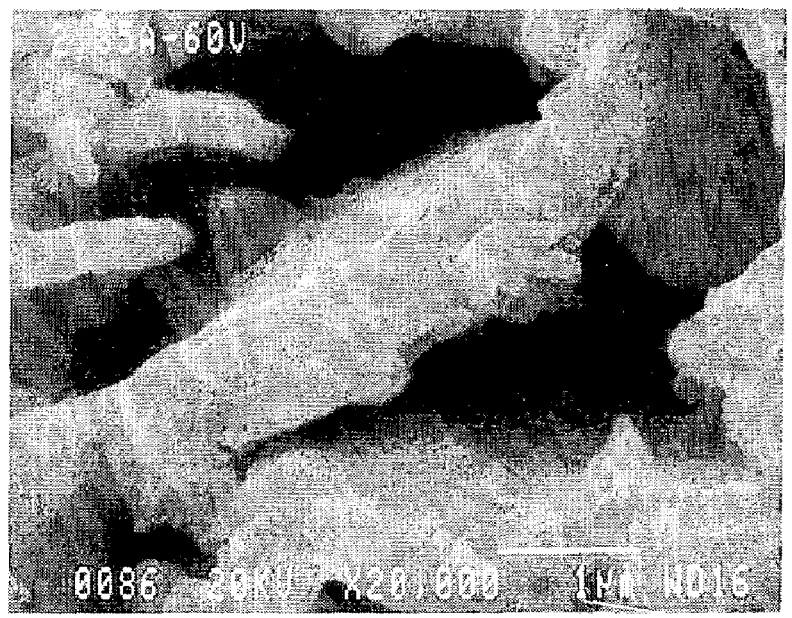
FIG. 9 is an illustration of 20,000×SEM of an anode formed at 60 V.

FIGS. 4-9 illustrate anodes made from niobium flake that were anodized at 20, 40, or 60 V. FIG. 4 is an illustration of 10,000×SEM of an anode formed at 20 V. FIG. 5 is an illustration of 20,000×SEM of an anode formed at 20 V. FIG. 6 is an illustration of 10,000×SEM of an anode formed at 40 V. FIG. 7 is an illustration of 20,000×SEM of an anode formed at 40 V. FIG. 8 is an illustration of 10,000×SEM of an anode formed at 60 V. Finally, FIG. 9 is an illustration of 20,000× SEM of an anode formed at 60 V.

Figure 10:
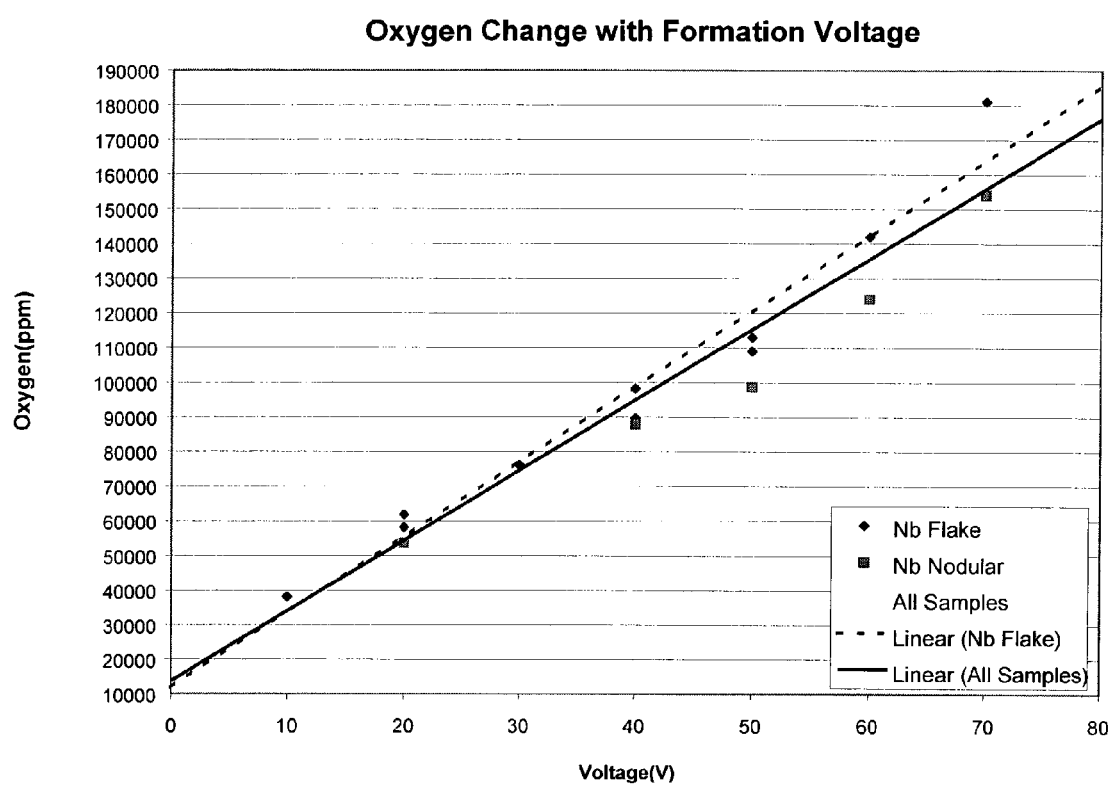
FIG. 10 illustrates a linear relationship between the final oxygen content and formation voltage.

The linear relationship between the final oxygen content and formation voltage of Examples 2 and this example can be seen in FIG. 10. R2 values indicate a good correlation between voltage and oxygen for the flake samples (R2=0.96) and for all samples (R2=0.94) in general.

Example 4

Two sets of samples were prepared. The first set of samples was prepared by pressing 4 wafers of niobium flake having a BET surface area of about 4 m²/g into a pellet of approximately 0.75" diameter and 0.1" high using an isostatic press. The pellets were then placed in 1% $H_3PO_4$ solution and formed at 0, 20, 40, or 60 volts until current decays to below 0.1 amps, which indicated that the film is no longer growing. The pellets were then labeled and were placed in a furnace similar to the one in Example 1. Samples were then tested for oxygen after the furnace treatment.

In the second set of samples, the same type of niobium powder was placed in a ceramic crucible with water and mixed to water agglomerate. The crucibles were then placed in a HT-3 Solar Atmospheres Furnace, Inc. wherein the furnace was slowly evacuated to less than 20 torr. The furnace was then back filled with argon and then slowly evacuated again to a rough vacuum. Argon was then introduced and continued throughout the run. The temperature was increased to 2192° F. The temperature was held for 30 minutes and then the temperature was decreased to 1000° F. using a ramp of 30° F. per minute. The temperature was held at 1000° F. The furnace was then cooled with argon flowing until the temperature reached below 150° F. The argon gas was then stopped and the furnace was evacuated to 20 torr. Air was introduced in 100 torr intervals until atmospheric pressure was obtained. The samples were then removed from the furnace and allowed to cool.

The crucible was then anodized in a similar manner as the niobium flake in the previous sample by placing the crucible in a $H_3PO_4$ solution and anodized at 20 or 30 volts. After the anodization process, the sample sets were placed in a furnace identical to the furnace used in Example 1. Samples were then tested for oxygen content after the furnace treatment.

Figure 11:
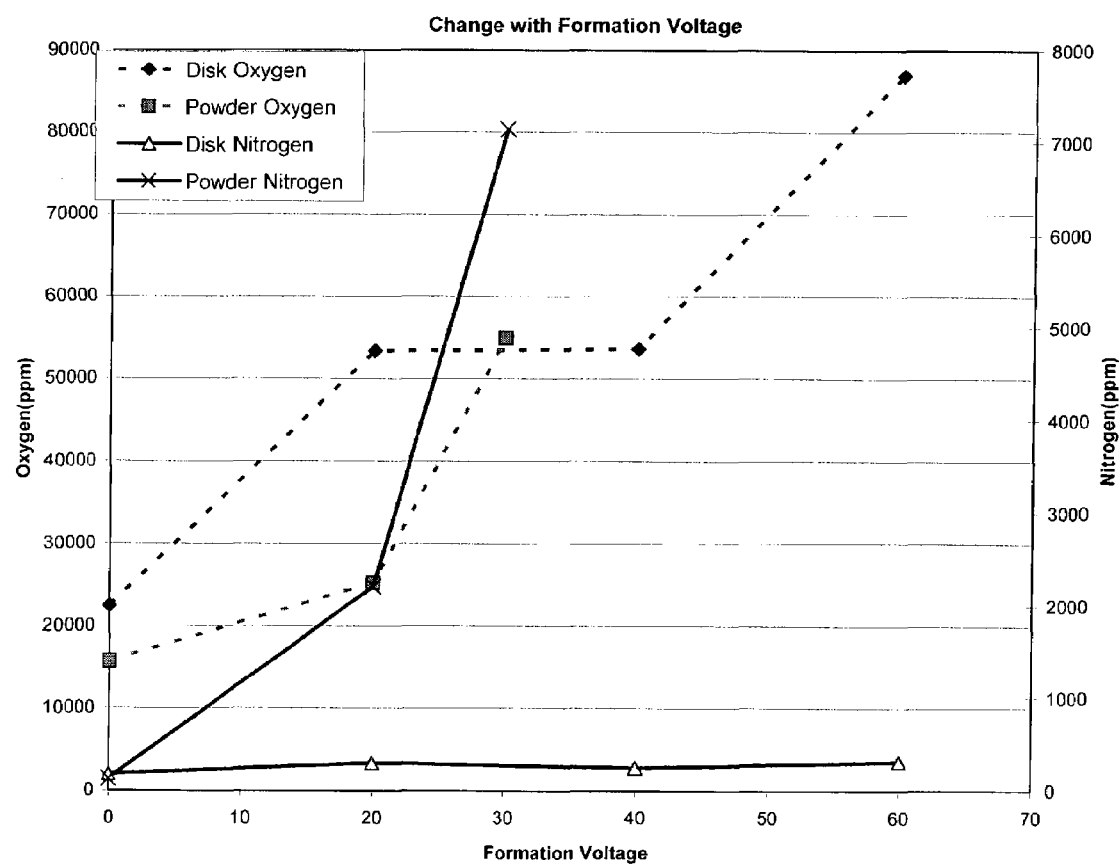
FIG. 11 illustrates the nitrogen and oxygen content with change of formation voltage.

The heat treated/$H_2O$ agglomerated materials picked up a large amount of oxygen and nitrogen during the anodization and subsequent heat treatment at 1562° F. in argon. These samples were labeled as "powder" in the FIG. 11 and Table 9. The pressed disks anodized at 0, 20V, 40V, and 60V also picked up a significant amount of oxygen during the heat treat and anodization steps.

TABLE 9

|  | Voltage | O (ppm) | N (ppm) |
| --- | --- | --- | --- |
| Disk | 0 | 22468 | 181 |
| Disk | 20 | 53361 | 300 |
| Disk | 40 | 53627 | 247 |
| Disk | 60 | 86847 | 316 |
| Powder | 0 | 15743 | 128 |
| Powder | 20 | 25230 | 2205 |
| Powder | 30 | 54988 | 7144 |

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method to form a metal oxide powder comprising diffusing oxygen from a metal oxide film present on a metal powder formed into a pressed article to form said metal oxide powder having a form of said pressed article, wherein said diffusing takes place in an inert atmosphere, or in a hydrogen atmosphere, or in a vacuum, wherein the metal of said metal oxide film and the metal of said metal powder are the same, wherein an anodic oxide film is formed on the pressed article to form said metal oxide film, and wherein said metal powder is niobium and said metal oxide film is niobium pentoxide.

2. The method of claim 1, wherein said anodic oxide film is formed by applying a voltage of from about 10 volts to about 100 volts to said metal powder to form said anodic oxide film.

3. The method of claim 2, wherein said voltage is from about 10 to about 80 volts.

4. The method of claim 1, wherein said metal oxide powder is NbO.

5. The method of claim 1, wherein said metal oxide powder has an atomic ratio of niobium to oxygen of less than 2:1.

6. A method to form a metal oxide powder comprising forming an oxide film on a metal powder formed into a pressed article; and diffusing oxygen from said oxide film through said metal powder to form said metal oxide powder having a form of said pressed article, and wherein said diffusing takes place in an inert atmosphere, or in a hydrogen atmosphere, or in a vacuum, and wherein the metal of said metal oxide film and the metal of said metal powder are the same, wherein an anodic oxide film is formed on the pressed article to form said oxide film, and wherein said metal powder is niobium and said oxide film is niobium pentoxide.

7. The method of claim 6, wherein said diffusing is achieved by heat treating said metal powder.

8. The method of claim 7, wherein said heat treating is at a temperature of at least 200° C. for a sufficient time to diffuse said oxygen from said oxide film to at least a portion of said metal powder.

9. The method of claim 8, wherein said heat treating is at a temperature of from about 200 to about 1500° C.

10. The method of claim 6, wherein said metal oxide powder is completely formed throughout said pressed article.

11. The method of claim 6, wherein said diffusing is partial wherein a metal oxide powder is formed and is present with a portion of said metal powder.

12. The method of claim 6, wherein said oxygen diffuses through a portion of said metal powder to form a metal oxide powder and a core of metal powder is not converted to a metal oxide powder.

13. The method of claim 6, further comprising reanodizing said metal oxide powder to form an oxide film on said metal oxide powder.

14. The method of claim 6, wherein said metal oxide powder is NbO.

15. The method of claim 6, wherein said metal oxide powder has an atomic ratio of niobium to oxygen of less than 2:1.

16. The method of claim 15, further comprising reanodizing said metal oxide powder to form an oxide film on said metal oxide powder.

17. A method to form a metal oxide powder comprising diffusing oxygen from a metal oxide film present on a metal powder formed into a pressed article to form said metal oxide powder having a form of said pressed article, wherein said diffusing takes place in an inert atmosphere, or in a hydrogen atmosphere, or in a vacuum, and wherein the metal of said metal oxide film and the metal of said metal powder are the same, wherein said pressed article is reduced to a powder after said oxide film is present and after said diffusing takes place, wherein an anodic oxide film is formed on the pressed article to form said metal oxide film, and wherein said metal powder is niobium and said metal oxide film is niobium pentoxide.

18. The method of claim 17, wherein said metal oxide powder is NbO.

19. A method to form a metal oxide powder comprising diffusing oxygen from a metal oxide film present on a metal powder formed into a pressed article to form said metal oxide powder having a form of said pressed article, wherein said diffusing takes place in an inert atmosphere, or in a hydrogen atmosphere, or in a vacuum, and wherein the metal of said metal oxide film and the metal of said metal powder are the same, wherein said pressed article is reduced to a powder after said metal oxide film is present and prior to said diffusing takes place, and wherein said diffusing is achieved by heat treating said metal powder.

* * * * *